(12) United States Patent
Wade

(10) Patent No.: US 9,003,899 B2
(45) Date of Patent: *Apr. 14, 2015

(54) FORCE SENSOR

(75) Inventor: Richard Wade, Worthington, OH (US)

(73) Assignee: Honeywell International Inc., Morristown, NJ (US)

( * ) Notice: Subject to any disclaimer, the term of this patent is extended or adjusted under 35 U.S.C. 154(b) by 310 days.

This patent is subject to a terminal disclaimer.

(21) Appl. No.: 13/429,280

(22) Filed: Mar. 23, 2012

(65) Prior Publication Data

US 2013/0247690 A1    Sep. 26, 2013

(51) Int. Cl.
*G01L 1/22* (2006.01)
*G01N 3/00* (2006.01)
*G01L 1/18* (2006.01)
*G01L 9/00* (2006.01)

(52) U.S. Cl.
CPC ............... *G01L 1/18* (2013.01); *G01L 9/0052* (2013.01)

(58) Field of Classification Search
CPC .......................................................... G01L 1/22
USPC .................. 73/862.627, 760; 29/595, 428
See application file for complete search history.

(56) References Cited

U.S. PATENT DOCUMENTS

| | | | |
|---|---|---|---|
| 4,155,325 A | 5/1979 | Yu | |
| 4,265,164 A | 5/1981 | Maeda et al. | |
| 4,645,965 A | 2/1987 | Paganelli | |
| 5,165,289 A | 11/1992 | Tilmans | |
| 5,184,107 A | 2/1993 | Maurer | |
| 5,187,985 A | 2/1993 | Nelson | |
| 5,223,776 A | 6/1993 | Radke et al. | |
| 5,303,593 A | 4/1994 | Kremidas | |
| 5,333,504 A | 8/1994 | Lutz et al. | |
| 5,357,808 A | 10/1994 | Fung et al. | |
| 5,438,875 A | 8/1995 | Fung et al. | |
| 5,499,041 A | 3/1996 | Brandenburg et al. | |

(Continued)

FOREIGN PATENT DOCUMENTS

| | | |
|---|---|---|
| EP | 0091282 A2 | 10/1983 |
| EP | 0354366 B1 | 11/1992 |

(Continued)

OTHER PUBLICATIONS http://www.digikey.com/catalog/en/partgroup/fsg-series-force-sensor/23592?print=1, "FSG Series Force Sensor", Sensing and Control, 1 page, printed Aug. 1, 2012.

(Continued)

*Primary Examiner* — Lisa Caputo
*Assistant Examiner* — Brandi N Hopkins
(74) *Attorney, Agent, or Firm* — Seager Tufte & Wickhem LLC.

(57) ABSTRACT

A force sensor may include a sensing die with a sense diaphragm. An actuation assembly may include a button member and a pin and/or other features, where a first end of the pin may engage the sense diaphragm and a second end of the pin may engage the button to facilitate transferring a force applied to the button to the sense diaphragm. In some cases, the interface between the button member and the pin may allow the button member to swivel or pivot, at least to some degree, relative to the pin, which may facilitate transferring a force from the button member to the diaphragm with minimal mechanical loss. In some cases, the second end of the pin may be at least partially tapered, with the taper engaging the edge of an indentation in the button.

22 Claims, 7 Drawing Sheets

(56) References Cited

U.S. PATENT DOCUMENTS

| | | |
|---|---|---|
| 5,587,601 A | 12/1996 | Kurtz |
| 5,661,245 A | 8/1997 | Svoboda et al. |
| 5,744,726 A | 4/1998 | Maurer |
| 5,760,313 A * | 6/1998 | Guentner et al. ........ 73/862.584 |
| 5,996,419 A | 12/1999 | Sokn |
| 5,999,084 A | 12/1999 | Armstrong |
| 6,255,728 B1 | 7/2001 | Nasiri et al. |
| 6,311,561 B1 | 11/2001 | Bang et al. |
| 6,343,991 B1 | 2/2002 | Armstrong |
| 6,351,996 B1 | 3/2002 | Nasiri et al. |
| 6,481,286 B1 | 11/2002 | Bernstein et al. |
| 6,489,668 B1 | 12/2002 | Oda Zenzo et al. |
| 6,601,455 B2 | 8/2003 | Kurtz et al. |
| 6,705,166 B2 | 3/2004 | Leonardson |
| 6,712,778 B1 | 3/2004 | Jeffcoat et al. |
| 6,736,015 B1 | 5/2004 | Repperberger et al. |
| 6,778,916 B2 | 8/2004 | Lee |
| 6,813,956 B2 | 11/2004 | Kurtz et al. |
| 6,874,377 B2 | 4/2005 | Karbassi et al. |
| 6,907,789 B2 | 6/2005 | Bodin |
| 7,099,652 B2 | 8/2006 | Brown et al. |
| 7,287,432 B2 | 10/2007 | Schnaare et al. |
| 7,290,453 B2 | 11/2007 | Brosh |
| 7,360,438 B2 | 4/2008 | Gaines |
| 7,404,338 B2 | 7/2008 | Hierold et al. |
| 7,462,919 B2 | 12/2008 | Engling et al. |
| 7,503,221 B2 | 3/2009 | Wade |
| 7,554,167 B2 | 6/2009 | Vaganov |
| 7,726,197 B2 * | 6/2010 | Selvan et al. ................... 73/777 |
| 7,775,126 B2 | 8/2010 | Eckhardt et al. |
| 7,775,127 B2 | 8/2010 | Wade |
| 7,791,151 B2 | 9/2010 | Vaganov et al. |
| 7,880,247 B2 | 2/2011 | Vaganov et al. |
| 8,004,052 B2 | 8/2011 | Vaganov |
| 8,024,978 B2 | 9/2011 | Khemet et al. |
| 8,091,436 B2 | 1/2012 | Eckhardt et al. |
| 8,183,077 B2 | 5/2012 | Vaganov et al. |
| 2009/0263062 A1 | 10/2009 | Smith et al. |
| 2011/0000318 A1 | 1/2011 | Bradley et al. |
| 2012/0152037 A1 | 6/2012 | Wade |

FOREIGN PATENT DOCUMENTS

| | | |
|---|---|---|
| EP | 1519173 A1 | 3/2005 |
| EP | 1348110 B1 | 5/2005 |
| EP | 2110569 A1 | 10/2009 |
| JP | 63196080 A | 8/1988 |
| WO | WO 9919704 A1 | 4/1999 |
| WO | WO 0135066 A1 | 5/2001 |
| WO | WO 0165232 A1 | 9/2001 |
| WO | WO 02103369 A1 | 12/2002 |
| WO | WO 2005038422 A1 | 4/2005 |
| WO | WO 2007127738 A2 | 11/2007 |
| WO | WO 2010048040 A2 | 4/2010 |

OTHER PUBLICATIONS http://www.gesilicones.com/siliconesweb/am1/en/documentsdatasheets;1838.html, "Momentive Performance Materials," 5 pages, printed Nov. 19, 2008.

Honeywell, "Airflow, Force, and Pressure Sensors, Product Range Guide," 20 pages, Nov. 2010.

Honeywell, "Force Sensors Line Guide," 4 pages, Jun. 2009.

Honeywell, "Pressure, Airflow, Force", Sensing and Control, pp. 1-10, 2003.

Honeywell, "Pressure Sensors FS01/FS03 Force Sensors," 4 pages, 2003.

Honeywell, "TruStability Silicon Pressure Sensors: HSC Series-High Accuracy," 12 pages, Jul. 2010.

Honeywell, "TruStability Silicon Pressure Sensors: SSC Series—Standard Accuracy," 12 pages, Jul. 2010.

* cited by examiner

FORCE SENSOR

TECHNICAL FIELD

The present disclosure relates generally to sensors, and more particularly, to force sensors for sensing a force applied to the sensors.

BACKGROUND

Force sensors are often used to sense an external force applied to the sensors and provide an output signal representative of the applied force. Such sensors can be used in a wide variety of applications, including medical applications. Example medical applications include use in medical equipment in control of, for example, kidney dialysis machines, drug delivery systems, hematology equipment, infusion pumps, entrial feeders, ventilation equipment, as well as other medical equipment. Force sensors are also commonly used in non-medical applications, such as industrial applications, military applications as well as other applications.

SUMMARY

The present disclosure relates generally to sensors, and more particularly, to force sensors for sensing a force applied to the sensors. In one illustrative embodiment, a button member is provided for receiving a force. The button member may extend toward a force sensor, and may engage a pin or extender. The pin or extender may extend toward the force sensor, and may transmit the force from the button member to the force sensor. In some cases, the interface between the button member and the pin or extender may allow the button member to swivel or pivot, at least to some degree, relative to the pin or extender.

In some cases, the travel of the pin or extender toward the force sensor may be guided by an aperture through a substrate to which the force sensor is mounted. Travel of the button member may be guided by an aperture through a housing member, which may be mounted to the substrate and/or the force sensor. In some cases, an end of the pin or extender may have a conical shape, which can be received by an indentation in the button member. Alternative, an end of the button member may have a conical shape, which can be received by an indentation in the pin or extender. These are just some examples. More generally, it is contemplated that any suitable interface may be used between the button member and the pin or extender, including those that allow the button member to swivel or pivot, at least to some degree, relative to the pin or extender during operation of the force sensor.

In some cases, a force sensor may include a sensing die mounted to a substrate, and an actuation assembly for transmitting an external force to the sensing die. The sensing die may include a diaphragm and one or more sensing elements (e.g. piezoresistive elements) positioned on the diaphragm. The actuation assembly may include the pin or an extender and the button member, among other features, as desired. In some cases, the pin or extender may have a first end configured to contact the diaphragm of the sensing die and a second end having a tapered portion configured to contact the button member, where the tapered portion of the second end may engage an edge of an indentation in the button member. This is just one example interface between the button member and the pin or extender.

In some cases, the force sensor may include one or more housing members secured relative to the substrate. The housing member(s) may define a cavity around the sensing die and may include an opening sized to receive the button member and/or the pin member therethrough. In operation, the actuation assembly may be configured to transmit a force applied to the button member to the diaphragm via the pin or extender member, such that the force sensor outputs a signal that is related to the force applied to the button member.

In some instances, the back side of the sensing die may be mounted to the substrate, sometimes using an adhesive. In this instance, wire bonds may be utilized to electrically connect the sensing die to the substrate. In other cases, the front side of the sensing die may be mounted to the substrate, sometimes using an adhesive. In some of these cases, the adhesives may include a pattern of electrically conductive adhesive and nonconductive adhesive to selectively electrically connect bond pads of the sensing die to bond pads on the substrate. In some cases, Ball grid array (BGA) and/or other mounting methods may be employed, if desired. In these cases, optionally, wire bonds may not be needed to electrically connect the sensing die to the substrate.

In some cases, the force sensor may also include signal conditioning circuitry mounted on the substrate and in electrical communication with the sensing die. The signal conditioning circuitry may be configured to receive one or more electrical signals from the sensing die, and condition the signals to provide a conditioned output signal from the force sensor.

An illustrative method of manufacturing a force sensor may include mounting a front or back side of a sensing die to a first or second side of a substrate, wherein the sensing die includes a diaphragm and one or more sensing elements. The method may also include providing an actuation assembly in contact with a back or front side of the diaphragm, wherein the actuation assembly is configured to transmit an external force to the internally positioned diaphragm. The actuation assembly may include an extender having a first end and a second end, where the first end may contact the diaphragm (e.g., directly and/or indirectly) and the second end may be at least partially tapered and contact the button member along a cross-section plane of the tapered portion. In some cases, the method may include positioning a housing member on the first side of the substrate to define a first cavity around the sensing die and the actuation assembly, wherein the button member is configured to extend through an opening in the housing member and engage the extender. The method may also include mounting signal conditioning circuitry to the substrate in electrical communication with the sensing die, wherein the signal conditioning circuitry may be configured to receive an electrical signal from the sensing die and condition the signal to provide a conditioned output signal from the force sensor.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION

The disclosure may be more completely understood in consideration of the following detailed description of various illustrative embodiments of the disclosure in connection with the accompanying drawings, in which.

Figure 1:
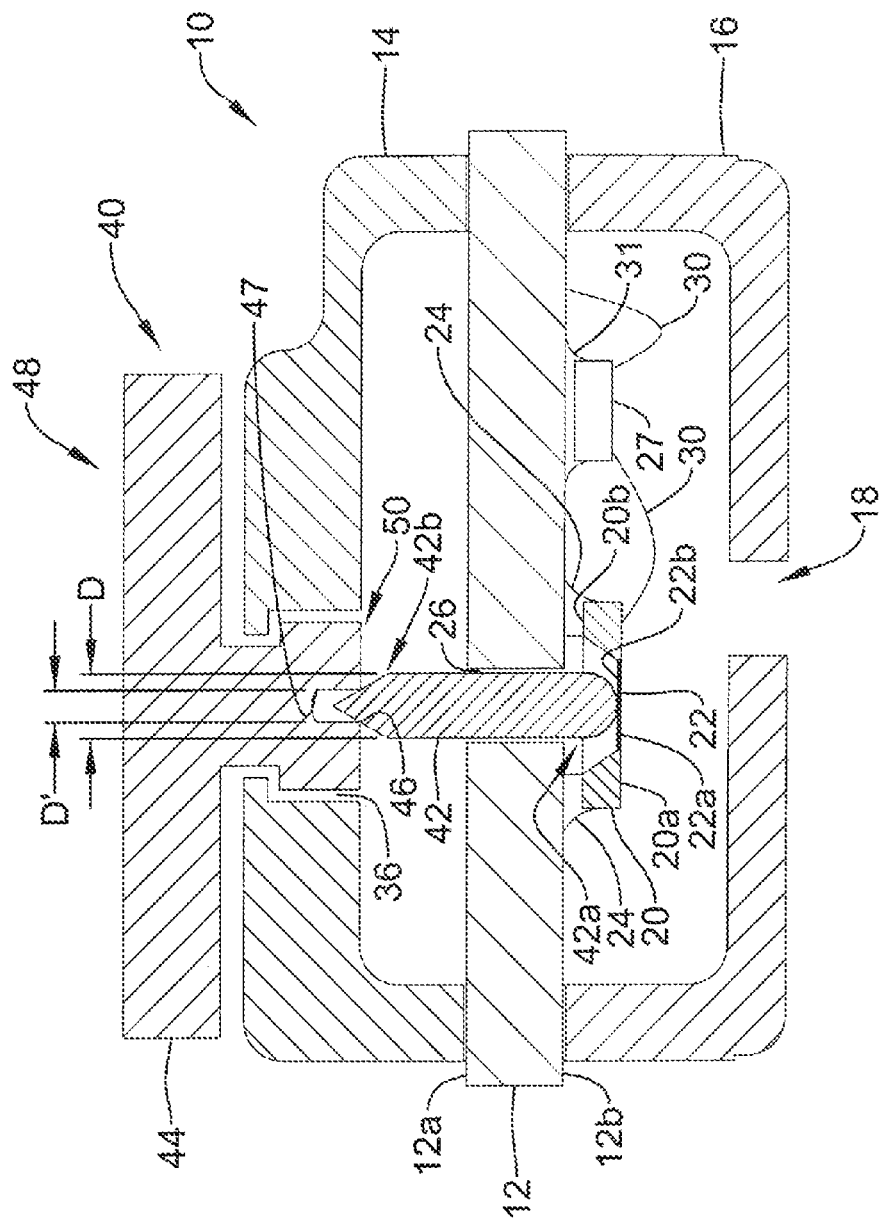
FIG. 1 is a schematic cross-sectional view of an illustrative force sensor.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described herein. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The detailed description and drawings show several embodiments which are meant to be illustrative of the disclosure. It should be understood that any numbering of disclosed features (e.g., first, second, etc) and/or directional terms used in conjunction with disclosed features (e.g., front, back, under, above, etc.) are relative terms indicating illustrative relationships between the pertinent features.

FIG. 1 is a cross-sectional view of an illustrative embodiment force sensor 10. In the illustrative embodiment of FIG. 1, the force sensor 10 includes a sensing die 20 having a front side 20a and a back side 20b mounted relative to a package substrate 12 having a first side 12a and a second side 12b, where the sensing die 20 may be mounted to package substrate 12 using an adhesive 24, solder or the like. In some cases, the sensing die 20 may be provided in a package (not shown), and the package may be mounted to the package substrate 12.

Figure 3:
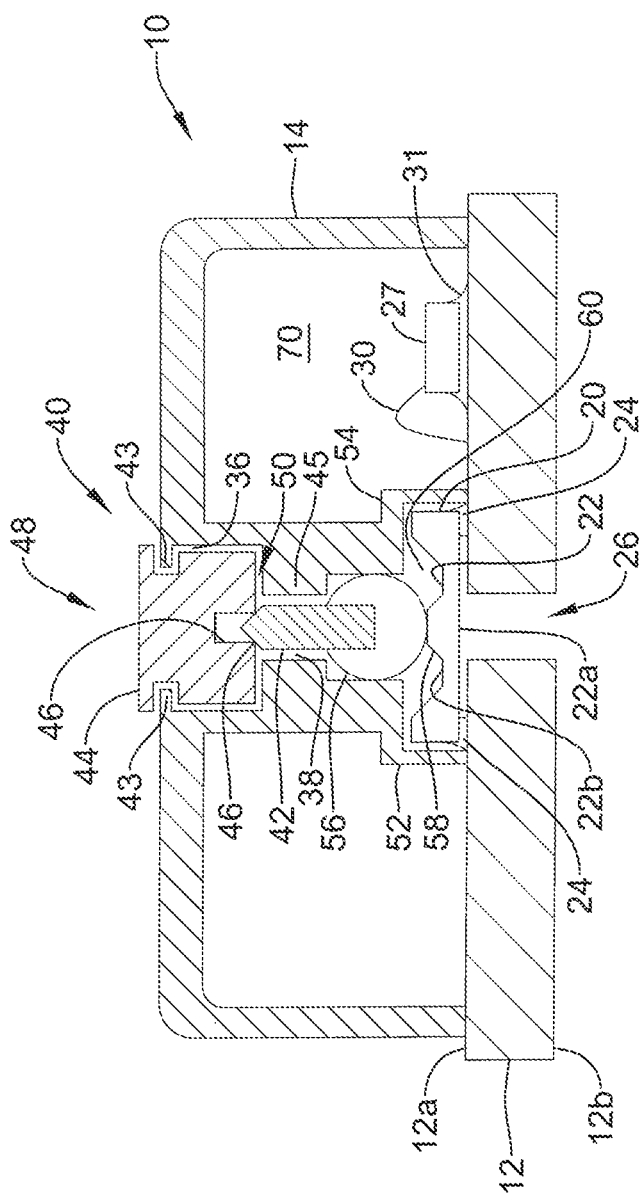
FIG. 3 is a schematic cross-sectional view of an illustrative force sensor that includes signal conditioning circuitry and an actuation assembly with a spherical object.
Figure 4:
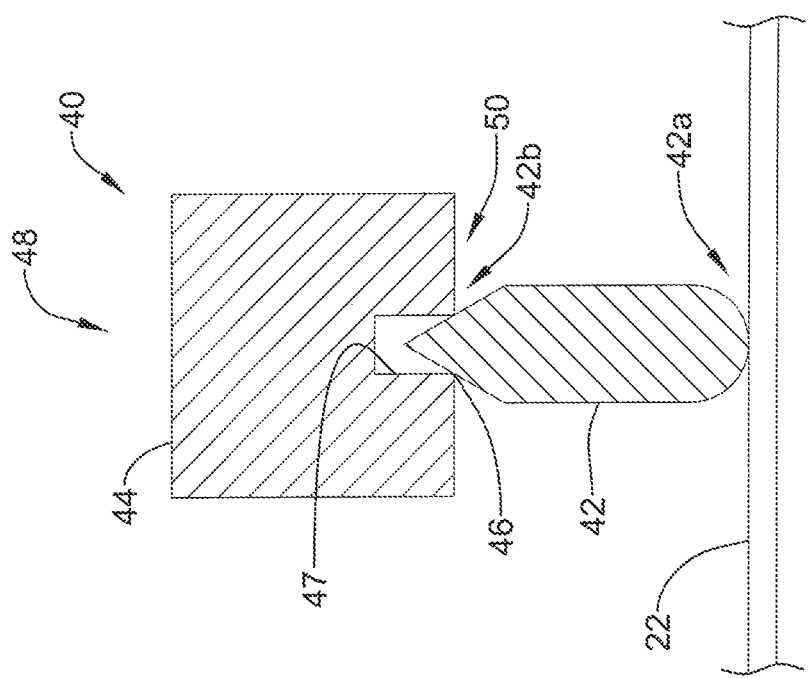
FIG. 4 is a schematic cross-sectional view of an actuation assembly of an illustrative force sensor having a second end in a conical shape.

In some cases, the package substrate 12 may include a ceramic material, however, it is contemplated that other suitable materials may be used in addition to or as an alternative to the ceramic material (e.g. PCB), as desired. Illustratively, the package substrate 12 may be a thick film substrate. In some instances, the sensing die 20 may be a micromechanical sensor die fabricated using a silicon wafer and suitable fabrication techniques (e.g., a mircomachined MEMS piezoresistive silicon sense die or other sensing die). The sensing die 20 may have one or more sensing elements, such as piezoresistive sensing components, and/or other circuitry (e.g. trim circuitry, signal conditioning circuitry, etc.) formed using suitable fabrication and/or printing techniques. In some cases, the sensing die 20 may include a sensing diaphragm 22 having a front side 22a and a back side 22b, and may include the one or more sensing elements formed or positioned thereon for sensing a deflection of the sensing diaphragm 22 upon application of force. In some instances, diaphragm 22 may include one or more bosses 58 extending from the back side 22b of sensing diaphragm 22, as shown in FIG. 3. The sensing diaphragm 22 may be fabricated by back-side etching a silicon die (e.g., using a KOH etch or other etching technique). However, it is contemplated that any suitable process may be used as desired. Force sensor 10 may further include an actuator assembly 40 configured to transfer a force applied external to the force sensor 10 to the sensing diaphragm 22.

Although not shown in FIG. 1, the force sensor 10 may include one or more electrical leads and/or bond pads on the substrate 12 that can be electrically connected to the pressure sensing die 20 for receiving one or more signals corresponding to the pressure or force sensed by the sensing die 20 (e.g. sensing diaphragm 22). In some cases, the one or more electrical leads may include metal, however, any suitable material may be used, as desired, such as conductive polymers.

When provided, the piezoresistive components may be configured to have an electrical resistance that varies according to an applied mechanical stress (e.g. deflection of sensing diaphragm 22). In some cases, the piezoresistive components may include a silicon piezoresistive material; however, it is contemplated that other non-silicon materials may be used if desired. The piezoresistive components may be connected in a Wheatstone bridge configuration (full or half bridge) or in other similar or dissimilar configurations, as desired. It is to be understood that the piezoresistive components are only one example of a sensing element that can be used, and it is contemplated that any other suitable sensing elements may be used, as desired.

In some instances, the sensing die 20 may be mounted to the substrate 12 using an adhesive 24 such as a silicone, RTV, a silicone-epoxy, a soft epoxy, or a regular or hard epoxy. In some embodiments, the adhesive 24 may include a conductive adhesive, a nonconductive adhesive, or a combination of conductive and nonconductive adhesives. When provided, the combination of conductive and nonconductive adhesive may be provided in a pattern to electrically connect bond pads of the sensing die 20 to bond pads on the substrate 12. Alternatively, or in addition, wire bonds may be provided to connect bond pads of the sensing die 20 to bond pads on the substrate 12. In some cases, Ball grid array (BGA) and/or other mounting methods may be employed, if desired. More generally, and when so configured, it is contemplated that the sensing die 20 may be mounted to the substrate 12 using any suitable bonding mechanism (e.g. adhesive 24, solder, eutectic, etc.).

As shown in FIG. 1, the sensing die 20 may be directly mounted to the substrate 12 with adhesive 24 with no intervening isolation layer(s) or substrate provided therebetween, but this is not required. In some instances, one or more isolation layers, such as a glass substrate (not shown), may be provided in force sensor 10 between the sensing die 20 and the substrate 12, if desired. In some cases, the sensing die 20 may include a silicon material and the package substrate 12 may include an alumina ceramic, which may have similar temperature expansion coefficients. The sensing die 20 and package substrate 12, however, may be made of other suitable materials, as desired.

In the illustrative instance shown in FIG. 1, the back side 20b of sensing die 20 may be mounted to the substrate 12 using an adhesive 24 as a bonding material and/or any other suitable bonding mechanism (e.g. solder, eutectic, etc.). When so provided, wire bonds 30 may be used to electrically connect bond pads on the front side 20a of the sensing die 20 to bond pads on circuitry 27 and/or bond pads on the substrate 12, as desired. Illustratively, when back side 20b of sensing die 20 has been mounted to the second side 12b of substrate 12, the actuator assembly 40 may be configured to contact (e.g., intimately contact) back side 22b of diaphragm 22 through opening 26 in substrate 12.

In some cases and as further described below, a first cover 14 may be mounted on the first side 12a of substrate 12, where the first cover 14 may be configured to receive and at least partially hold (e.g. guide) actuator assembly 40 in a desired orientation. A second cover 16 may be mounted to the second side 12b of substrate 12, where the second cover 16 may be configured to at least partially enclose the sense die 20, wire bond 30, bond pads, circuitry 27, and/or other electrical features in one or more compartments and may optionally have an opening 18. The two protective housings or covers 14, 16 may be attached to the substrate 12 with the same or substantially the same "footprint" on each side 12a, 12b, respectively, of substrate 12, but this is not required. In some cases, the protective housings or covers 14, 16 may be formed from, for example, plastic, polyamide, ceramic, metal, or any other suitable material. The first and second protective housings or covers 14, 16 may be attached to the package substrate 12 using any suitable adhesive or any other suitable bonding mechanism (e.g. solder, eutectic, etc.).

Figure 2:
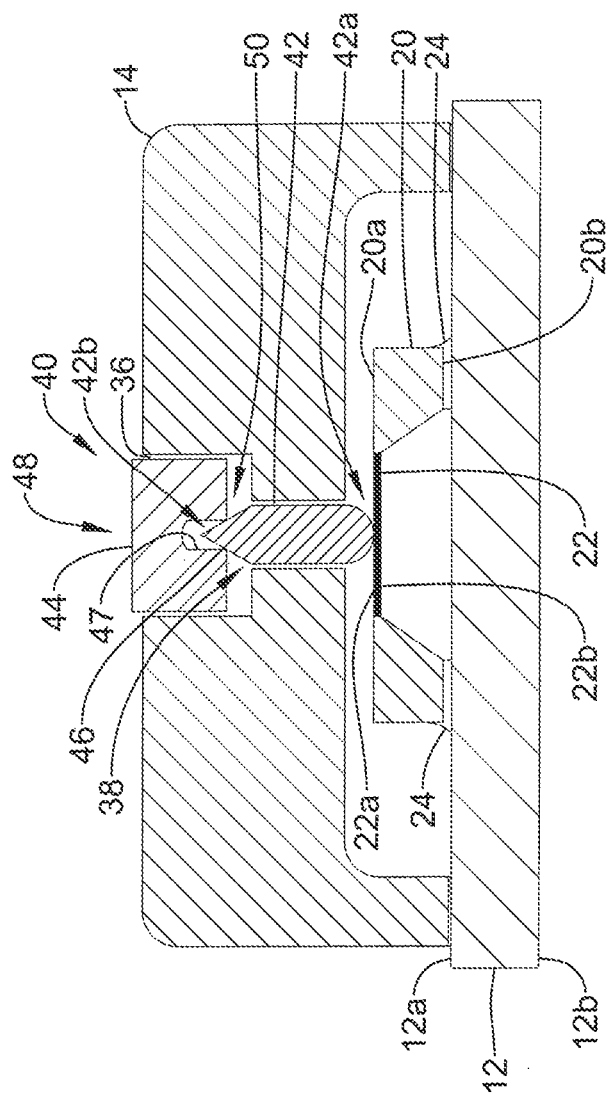
FIG. 2 is a schematic cross-sectional view of an illustrative force sensor.

In the illustrative instance shown in FIG. 2, the back side 20b of the sensing die 20 may face toward and may be mounted to the first side of 12a of substrate 12 using an adhesive 24 as a bonding material and/or any other suitable bonding mechanism (e.g. solder, eutectic, etc.). In this arrangement, substrate 12 may or may not, as desired, include opening 26 positioned under or above back side 22b of sensing diaphragm 22. In this instance, wire bonds 30 (now shown) may be provided to electrically connect bond pads on the front side 20a of sensing die 20, or bond pads at any other location of sensing die 20, to bond pads on first side 12a of substrate 12 and/or circuitry 27. Illustratively, when back side 20b of sensing die 20 has been mounted to the first side 12a of substrate 12, the actuator assembly 40 may be configured to contact (e.g., intimately contact) front side 22a of diaphragm 22. In some cases, first cover 14 may be mounted on the first side 12a of substrate 12, where the first cover 14 may be configured to receive, hold and guide actuator assembly 40 in a desired (or a substantially desired) orientation while at least partially enclosing the sensing die 20, wire bonds 30, bond pads, circuitry 27 and/or other electrical features in one or more compartments. A second cover 16 (not shown in FIG. 2) may be mounted to the second side 12b of substrate 12 and, in some cases, may be configured to create a desired pressure adjacent the back side 12b of substrate 12 (e.g., when an opening 26 is present in substrate 12), and/or may be configured to enclose any electrical features on or mounted on the back side 12b of substrate 12, and/or may be configured for any other purpose, as desired.

In the illustrative instance of FIG. 3, the front side 20a of the sensing die 20 may face toward and may be mounted to the first side 12a of the substrate 12 using an adhesive 24 as a bonding material and/or any other suitable bonding mechanism (e.g. solder, eutectic, etc.). In some cases, the adhesive 24 (e.g. a combination of conductive 82 and nonconductive 84 adhesive) may be configured to electrically connect bond pads of the sensing die 20 to one or more bond pads or trace conductors on the substrate 12 without the need for wire bonds. In some instances, the sensing die 20 may be flip chip mounted to the substrate 12 using bump bonds, a solder ball grid array (BGA), or any other suitable technique, as desired. In addition to facilitating a mechanical and/or electrical connection between substrate 12 and sensing die 20, the mounting technique may provide space for the diaphragm 22 to deflect as a force is applied thereto.

Sensing die 20 may be positioned or configured on substrate 12 such that opening 26 is adjacent front side 22a of diaphragm 22, allowing diaphragm 22 to communicate with the second side 12b of substrate 12 and optionally providing space for diaphragm 22 to deflect as a force is applied thereto. In this instance, for example, opening 26 may be configured to allow the front side 20a of sensing die 20 to communicate with a pressure adjacent the second side 12a of the substrate 12. When the front side 20a of sensing die 20 has been mounted to the first side 12a of substrate 12, the actuator assembly 40 may be configured to contact (e.g., intimately contact) back side 22b of diaphragm 22. In some cases, first cover 14 may be mounted on the first side 12a of substrate 12, where the first cover 14 may be configured to receive, hold and guide actuator assembly 40 in a desired (or substantially desired) orientation while at least partially enclosing the sensing die 20, wire bonds 30 (if any), bond pads, circuitry 27 and/or other electrical features in one or more compartments. A second cover 16 (not shown in FIG. 3) may be mounted to the second side 12b of substrate 12 and may be configured to create a desired pressure adjacent the back side 12b of substrate 12, enclose any electrical features on or mounted on the back side 12b of substrate 12, and/or configured for any other purpose, as desired.

In some cases, where the front side 20a of sensing die 20 is mounted to substrate 12, the adhesive may be in a pattern that may be used for bonding the sensing die 20 to the substrate 12, where the sensing die 20 may be configured to include one or more bond pads 80 for electrical connection to the conductive traces or bond pads on the substrate 12 through the adhesive pattern. The bond pads may be electrically connected to the sensing elements (e.g. piezoresistors) and/or other circuitry (e.g. trim, amplification, etc.) on the sensing die 20.

Figure 7:
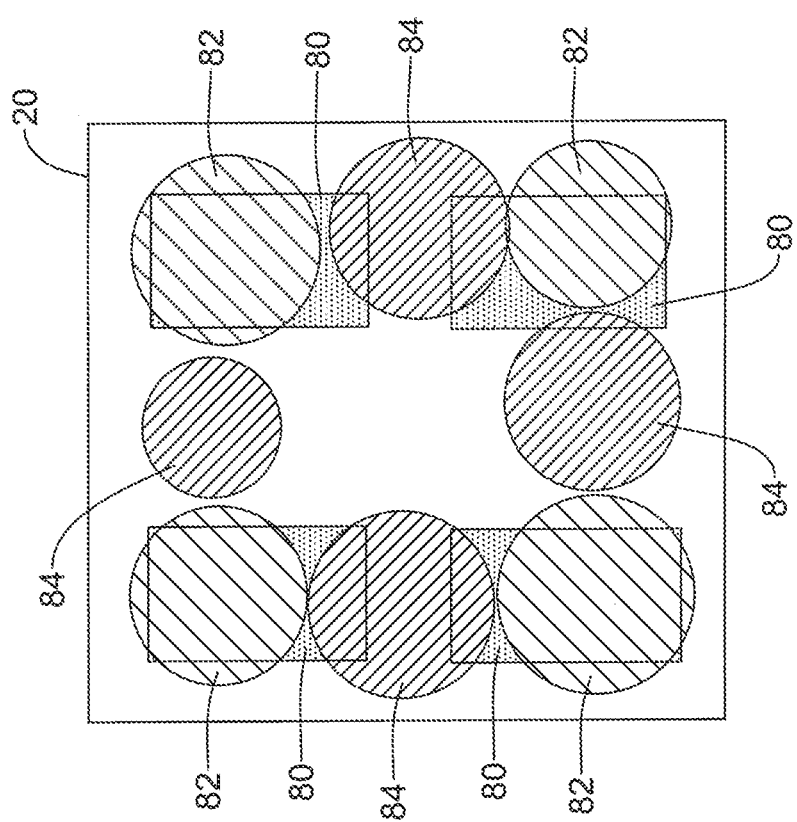
FIG. 7 is a schematic diagram of an illustrative adhesive pattern that may be used to bond a sensing die to a substrate.

In the illustrative instances, the adhesive may include a conductive adhesive 82 and nonconductive adhesive 84 patterned to electrically and mechanically attach the sensing die 20 to the substrate 12 (e.g. conductive traces of substrate 12), as depicted in FIG. 7. The conductive adhesive 82 and the nonconductive adhesive 84 may be configured in an alternating pattern on the sensing die 20. In this example, the conductive adhesive 82 may be at least partially applied over each or the one or more bond pads 80 to electrically connect the bond pads 80 to the bond pads of the substrate 12. The nonconductive adhesive 84 may be applied between adjacent conductive adhesives 82 to provide electrical isolation between the bond pads. In the illustrated example of FIG. 7, with four bond pads 80 being shown, there may be four applications of conductive adhesive 82 (one for each bond pad 80), each separated by nonconductive adhesive 84. This, however, is just one example and it is contemplated that other adhesive patterns and number of applications of conductive and nonconductive adhesive may be used.

In some illustrative instances, it is contemplated that any suitable conductive adhesive 82 and nonconductive adhesive 84 may be used. One example nonconductive adhesive 84 is RTV6424, which is available from Momentive Performance Materials Inc. of Waterford, N.Y. One example conductive adhesive 82 is SDC5000, which is available from Momentive Performance Materials Inc. of Waterford, N.Y. These are just examples, and it is contemplated that any other suitable conductive and nonconductive adhesive may be used.

In some embodiments, the conductive and nonconductive adhesives 82, 84 may be applied at any suitable thickness to mechanically attach the sensing die 20 to the substrate 12. For example, the conductive adhesive 82 and the nonconductive adhesive 84 may have a thickness in the range of about 0.01 millimeters to about 1.0 millimeters, about 0.05 millimeters to about 0.75 millimeters, about 0.05 millimeters to about 0.5 millimeters, about 0.10 millimeters to about 0.25 millimeters, or any other range of thicknesses, as desired.

While FIG. 7 is shown with the conductive adhesive 82 and the nonconductive adhesive 84 applied to the sensing die 20, it is to be understood that the conductive adhesive 82 and the nonconductive adhesive 84 may be applied to the substrate 12 and/or the sensing die 20, as desired. Further, the illustrative pattern of conductive adhesive 82 and the nonconductive adhesive 84 is shown prior to the sensing die 20 mounted to the substrate 12 or, in other words, how the conductive adhesive 82 and the nonconductive adhesive 84 may be initially applied. Although not explicitly shown in FIG. 7, in some cases, the non-conductive adhesive 84 and the conductive adhesive 82 overlap one another, or otherwise may collectively provide a continuous adhesive pattern around a perimeter of the sensing die 20. This may help provide a seal between the sensing die 20 and the substrate 12 all the way around the perimeter of the sensing die 20, if desired.

The force sensor 10 may include the actuator assembly 40 for transmitting an external force to the sensing die 20. The actuator assembly 40 may include an extender or a pin 42 (FIGS. 1-3), a button 44 (FIGS. 1-3) and/or a spherical object 56 (e.g., a ball bearing) (FIG. 3). It can be appreciated that other types of actuators may be utilized such as, for example, slidable mounted plungers or shafts, point contact type components other than spherical objects, "T" shaped transfer mechanisms, as desired and in accordance with alternative embodiments.

In the illustrative instance shown in FIG. 1, pin 42 may be configured to abut diaphragm 22 at a first end 42a and to abut button 44 at a second end 42b and may include a length extending between the first end 42a and the second end 42b. In some cases, the pin 42 may include stainless steel or other suitable metal. It is contemplated, however, that other materials may be used, if desired, including, but not limited to, polymer based materials.

Where the sensing die 20 has been mounted on the second side 12b of substrate 12, pin 42 may be inserted into opening 26 and aligned or oriented to engage sensing die 20 (e.g., the back side 22b of sensing diaphragm 22). As shown in FIG. 1, the opening 26 and pin 42 may be configured such that opening 26 may act as a bearing bore for guiding pin 42. To facilitate opening 26 acting as a bearing bore for guiding pin 42 and/or for other purposes, the portions of substrate 12 forming the opening 26 and adjacent the opening 26 may be entirely or at least partially plated with one or more materials. Example plating materials may include, but are not limited to, any material(s) that may lubricate and/or reduce the coefficient of friction of opening 26, such as gold, nickel, or any other material, as desired. Illustratively, the first end 42a of pin 42 may be configured to be inserted through opening 26 and to contact the back side 22b of diaphragm 22. Alternatively, or in addition, where the sensing die 20 has been mounted on the first side 12a of substrate 12, pin 42 may be maintained in a relative position with respect to sensing die 20 by first cover or housing 14, as described in greater detail below.

In some cases, the first end 42a of pin 42 may be configured to reduce the time until a "drilling" failure mode might occur and/or help reduce the "drilling" failure mode from occurring, where the "drilling" failure mode may be prevalent in assemblies having blunt ended pins engaging sensing dies 20. Generally, the drilling failure mode may result from repeated contact between two blunt or sharp surfaces. An illustrative configuration of the first end 42a of pin 42 may include the first end 42a having an at least partially rounded surface, as shown in FIGS. 1 and 2, where the rounded first end 42a may allow for some slight slippage if the sensing die 20 is not perfectly centered on opening 26 and/or sensing diaphragm 22, and may reduce drilling by providing a rounded surface for contact between pin 42 and sensing diaphragm 22. Alternatively, or in addition, the first end 42a of pin 42 may abut a spherical object 56 (e.g., contact the spherical object 56 in an unsecured manner relative to the spherical object 56) and/or engage a spherical object 56 (e.g., contact the spherical object 56 in a substantially secured manner relative to the spherical object 56), as shown in FIG. 3, where the spherical object 56 may be configured to directly contact the sensing diaphragm 22.

Figure 5:
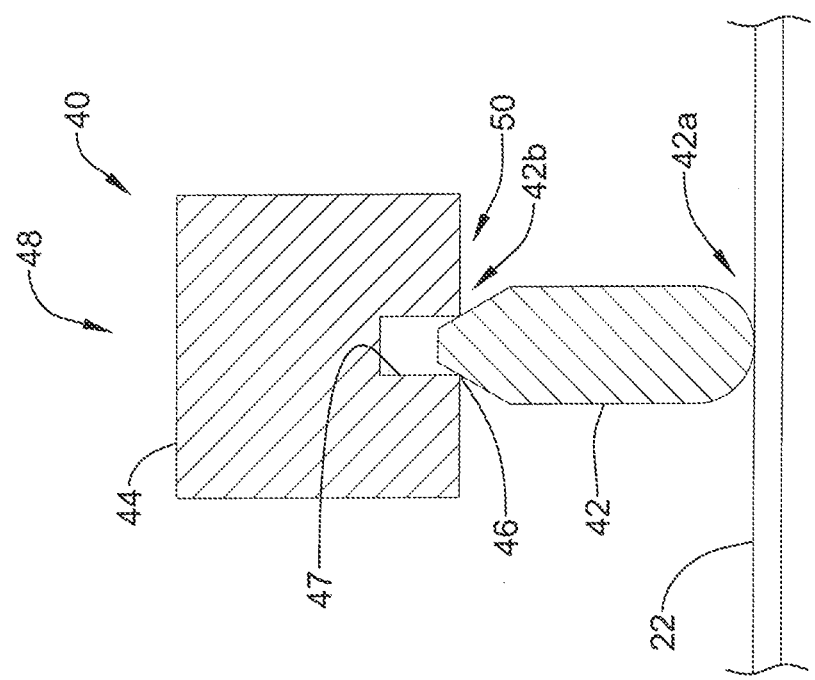
FIG. 5 is a schematic cross-sectional view of an actuation assembly of an illustrative force sensor having a second end that tapers to a flat end surface.
Figure 6:
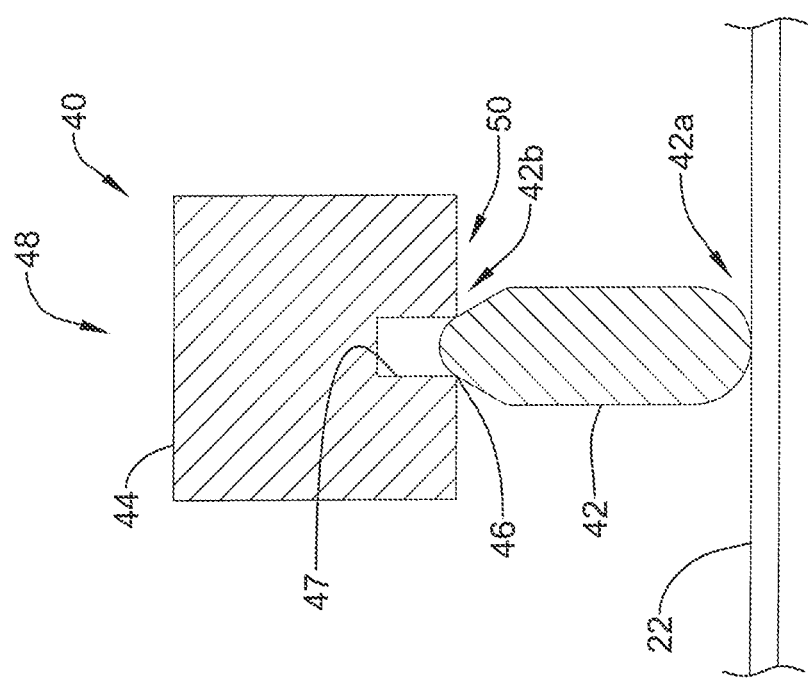
FIG. 6 is a schematic cross-sectional view of an actuation assembly of an illustrative force sensor having a second end that tapers toward a rounded end surface.

The second end 42b of pin 42 may be configured to abut an indentation (opening or hole) 46 in button 44 defined by an inner surface 47, where the indentation 46 may be sufficiently deep to allow the pin 42 to contact a narrow ring or opening circumference of the inner surface of the indentation 46. Further, the relationship between the indentation 46 in the button 44 and pin 42 may facilitate allowing button 44 to pivot when it is engaging or has received second end 42b of pin 42. Such an arrangement may facilitate button 44 transferring a load and/or external force applied thereto to sensing die 20 with minimal mechanical loss. Illustratively, the configuration of the second end 42b of pin 42 may include a taper towards button 44, where the tapered portion begins with a cross-section having a diameter D, as seen in FIG. 1. The second end 42b of pin 42 may take on any shape having a tapered portion. For example, the tapered second end 42b of pin 42 may taper to a point and may be substantially conical in shape (as seen in FIGS. 1-3 and 4), may taper to a flat end (as seen in FIG. 5), may taper to a rounded end (as seen in FIG. 6), and/or may take on any other shape, as desired. In some cases, first end 42a and second 42b of pin 42 may take on the same or substantially the same shape and size (e.g., the rounded end shape of second end 42b seen in FIG. 6, or any other shape, may be configured at both the first end 42a and the second end 42b of pin 42), such that both the first end 42a and the second end 42b may be configured to be utilized for contacting or abutting either of the button 44 and the diaphragm 22.

The indentation 46 of button 44 may take on any suitable shape and size. For example, the indentation 46 may be configured to receive a portion of the tapered portion of second end 42b of pin 42, where the indentation 46 may have an opening diameter of D'. The opening diameter D' of indentation 46 may be configured to be smaller than the diameter D of the beginning cross-section of the tapered portion of the second end 42b of pin 42, as shown in FIG. 1. In some cases, it is contemplated that end 50 of the button member 44 may have a conical shape, which may be received by an indentation in second end 42b of the extender or pin 42.

As shown in FIGS. 1-3, actuator assembly 40 may include button 44 that may receive or engage pin 42, where a cross-section of the button member 44 may in some cases be T-shaped (e.g., FIG. 1) or rectangular shaped (e.g., FIGS. 2 and 3) and/or any other suitable shape, as desired. Button member 44 may be at least loosely guided and/or positioned with respect to pin 42 by first housing or cover 14. Optionally, the button member 44 may maintain its position with respect to first cover 14 through a mechanical connector feature 43 therebetween (e.g., connector feature 43 may be an indentation in button member 44 and a protrusion extending from the housing or cover 14, as best seen in FIG. 3, or vice versa, or any other connector arrangement). For example, button member 44 may be connected to first cover 14 with a connector feature 43 that is a snap feature, a pressure fit feature, an additional element configured to snap into first cover 14 that may be able to trap the button 44 between it and the cover 14, and/or any other connection feature/technique that may allow the button 44 to pivot relative to pin 42.

As shown in FIG. 1, button 44 may be engaged or otherwise secured to the second end 42b of pin 42. For example, the second end 42b of the pin 42, which may be in a general conical shape, may be inserted into indentation 46 of the button 44. It is contemplated that second end 42b may be flat or have any other shape, as desired. When second end 42b is in a generally conical or tapered shape, the second end 42b may contact an entrance edge to the indentation 46 of the button member 44 along a cross-section plane of the tapered portion. In this configuration, the button member 44 may be able to swivel or pivot with respect to the second end 42b of pin 42, which may assist in increasing the repeatability of the force sensor 10 regardless of the orientation of the applied force due to the pin applying pressure at a consistent position on the sensing diaphragm 22. Such repeatability may be further enhanced when the first end 42a of pin 42 has a rounded or spherical shape.

As shown in FIGS. 1 and 2, the button member 44 may have a force receiving end 48 communicating with an environment external to the housing or cover 14 and a pin receiving end 50 opposite the force receiving end 48, where the force receiving end may be configured to receive a force external from force sensor 10. In some cases, force receiving end 48 may be generally flat or planar, however, it is contemplated that in other cases, force receiving end 48 may be curved (e.g. concave or convex) or may be formed to include other surface features for engaging a force transmitting object. For example, force receiving end 48 of button 44 may be contoured to engage a flexible tube, such as tubes used in the medical industry. The pin receiving end 50 may include the indentation 46 configured to receive the second end 42b of the pin 42. Alternatively, or in addition, the second end 42b of the pin 42 may include an indentation configured to receive the receiving end 50 (e.g., where the receiving end 50 may be at least partially tapered).

In some illustrative instances, the first protective housing or cover 14 may be configured to include an opening 36 for button 44 and/or for other feature(s) of actuator assembly 40. In some case, where sensing die 20 is attached to the first side 12a of substrate 12, first housing or cover 14 may include an inwardly protruding body 45 defining a chamber 38 for holding the actuator assembly 40 (e.g., namely the pin 42) in place. As shown in FIGS. 2 and 3, body 45 may be formed as part of the protective housing 14, however, it may be separately formed, as desired. Body 45 may be precisely formed with respect to the dimensions of pin 42 so as to facilitate maintaining a relatively constant point of contact between pin 42 and sensing diaphragm 22. Although not necessary, the body 45 may extend to the substrate 12. In instances where pin 42 extends through the opening 26 in substrate 12 to contact sensing diaphragm 22 (e.g., see FIG. 1), the body 45 may be optionally omitted due to opening 26 being optionally configured to facilitate maintaining a relatively constant point of contact between pin 42 and sensing diaphragm 22.

In some cases, where the signal conditioning circuitry 27 is mounted on or is a part of substrate 12, the signal conditioning circuitry may include a microprocessor, a microcontroller, an ASIC (Application Specific Integrated Circuit) and/or an ASSP (Application Specific Standard Product). The signal conditioning circuitry 27 may be mounted to the substrate 12 using an adhesive 31 or any other suitable bonding mechanism (e.g. solder, eutectic, etc.). As shown in FIGS. 1-3, signal conditioning circuitry 27 may be secured to the substrate 12 adjacent to the sensing die 20. The signal conditioning circuitry 27 may be electrically connected to sensing die 20 via trace conductors on the substrate 12, and in some cases, via bond wires 30. Trace conductors on the substrate 12 may be connected to connectors, leads, bond pads or terminals (not shown) of the force sensor 10. In some cases, it is contemplated that signal conditioning circuitry 27 may be electrically connected to the sensing die 20 in other ways, including direct die-to-die wire bonds, if desired. When the signal conditioning circuitry 27 and the sensing die 20 are in electrical communication, the signal conditioning circuitry 27 may be configured to receive an electrical output signal from the sensing die 20 and condition the electrical output signal to provide a conditioned output signal from the force sensor 10.

When provided, the signal conditioning circuitry 27 may include circuitry that receives an output signal from the sensing die 20, and may generate in response an electrical output signal having a magnitude representative of a magnitude of the force applied to the sensing die 20. The signal conditioning circuitry 27 may condition the output signal of the sensing die to correct for repeatable variations, such as offset, sensitivity, non-linearity, temperature effects, and/or other variations. In some cases, the signal conditioning circuitry 27 may condition the output signal to compensate for temperature-dependent variations in the electrical characteristic, to provide amplification to the output signal, and/or to account for nonlinear relationships between changes in the electrical characteristic and corresponding changes in the magnitude of the force.

In some instances, as shown in FIG. 3, force sensor 10 may include a housing or cover (e.g. protective housing or cover 14) that defines a first cavity 60 and a second cavity 70 for housing the sensing die 20 and signal conditioning circuitry 27, respectively. In the illustrative embodiment, the protective housing or cover 14 may include one or more protrusions 52 and 54 that are configured to engage and/or seal to substrate 12 to isolate cavities 60 and 70 from one another. With such a configuration, the signal conditioning circuitry 27 may be physically isolated from the sensing die 20 to, in some cases, assist in protecting the signal conditioning circuitry 27 from becoming contaminated and/or provide a more robust sensor package.

In an illustrative instance, protective housing or cover 14 may be formed or otherwise manufactured to include a recess formed in its underside to define cavity 70 for housing the signal conditioning circuitry 27. The protective housing or cover 14 may also be formed or otherwise manufactured to have a recess and/or protrusions defining cavity 60 for housing the sensing die 20 and actuation assembly. The protrusions, such as protrusions 52 and 54, may extend to the substrate 12 and may be bonded, secured, and/or sealed thereto. It is contemplated that any technique for forming cavities 60 and 70 may be used, as desired. In addition, any formed recess or protrusions, such as protrusions 52 and 54, may be utilized, as desired, to center or align the housing or cover 14 on substrate 12 with respect to the sensing die 20. Centering or aligning the housing or cover 14 with respect to sensing die 20 may be accomplished through utilizing the recess or protrusions 52 and 54 as guides to locate the sensing die 20 on substrate 12 and/or through any other technique.

In operation, when a current is applied to the piezoresistive sensing elements (e.g. to the Wheatstone bridge configuration of the piezoresistive sensing elements), an electrical output signal may be generated that is proportional to the degree of deflection of the diaphragm 22 or force applied to the force sensor 10. The actuation assembly may be configured to transmit an external force to the sensing diaphragm 22, thereby deflecting the sensing diaphragm 22 and, changing the resistance of the piezoresistive sensing elements. In some instances, the point of contact between the sensing diaphragm 22 and the pin 42 may determine to some extent the amount of electrical signal output, as differing points of contact producing different output signals for the same applied force. By restricting the movement of the pin 42 with the body 45 or the opening 26 of the substrate 12, providing a pivoting button 44, and as discussed above, maintaining a substantially single point of contact of the pin 42 on the sensing diaphragm 22, increased repeatability of the electrical signal output for a given applied external force may be achieved.

In some illustrative applications of force sensor 10, by detecting a force, the force sensor 10 may be used to determine the rate of flow of a medium through a tube. For example, the force sensor of FIG. 1 can be used to sense the amount of pressure a medium exerts on the interior walls of a tube, and may output an electrical signal that corresponds to the pressure exerted. The amount of pressure exerted on the inner walls of the tube may correlate to the rate of flow of the medium through the tube. As such, the electrical output of the force sensor 10 can be converted into the flow rate of the medium through the tube.

Having thus described the preferred embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respect, only illustrative. Changes may be made in details, particularly in matters of shape, size, and arrangement of parts without exceeding the scope of the disclosure. The disclosure's scope is, of course, defined in the language in which the appended claims are expressed.

What is claimed is:

1. A force sensor comprising:
a substrate including a first side and a second side, wherein the substrate includes an opening extending from the first side to the second side;
a sensing die including a front side and a back side, wherein:
the sensing die includes a diaphragm having a front side and a back side and one or more piezoresistive elements positioned on the front side of the diaphragm;
the back side of the sensing die is mounted relative to the second side of the substrate;
a housing member positioned on the first side of the substrate, wherein the housing member includes an opening positioned over the opening in the substrate;
an actuator assembly including:
a pin member elongated between a first end and a second end and extending through the opening in the substrate, wherein the first end of the pin member is configured to abut the back side of the diaphragm and the second end of the pin member has a tapered portion; and
a button member having a force receiving end and a pin receiving end and extending though the opening of the housing, wherein the pin receiving end of the button member engages the tapered portion of the second end of the pin member;
wherein the opening in the substrate is positioned over the diaphragm of the sensing die; and
wherein the actuator assembly is configured to transmit a force from the button member to the diaphragm.

2. The force sensor of claim 1, wherein:
the pin receiving end of the button member includes an indentation configured to receive the second end of the pin member.

3. The force sensor of claim 2, wherein at least part of the second end of the pin member is substantially conical in shape.

4. The force sensor of claim 3, wherein the indentation in the button member is substantially round and includes an opening diameter, wherein the opening diameter is smaller than an outer diameter of at least part of the second end of the pin member.

5. The force sensor of claim 1, wherein the first end of the pin member, which is configured to abut the back side of the diaphragm, is substantially round in shape.

6. The force sensor of claim 1, further comprising:
at least one of an application-specific integrated circuit (ASIC) and an application-specific standard product (ASSP) mounted to the second side of the substrate.

7. The force sensor of claim 6, wherein the sensing die and the at least one of the ASIC and ASSP are wire bonded to the substrate.

8. The force sensor of claim 7, further comprising:
a protective cover mounted to the second side of the substrate, wherein the protective cover at least partially covers the at least one of the ASIC and ASSP, the sensing die and the wire bonds.

9. The force sensor of claim 1, wherein the substrate is a ceramic thick film substrate.

10. The force sensor of claim 1, further comprising signal conditioning circuitry mounted on the substrate in electrical communication with the sensing die, wherein the signal conditioning circuitry is configured to receive an electrical output signal from the sensing die and condition the electrical output signal to provide a conditioned output signal from the force sensor.

11. The force sensor of claim 1, wherein the opening of the substrate is at least partially plated with a material.

12. A force sensor comprising:
a substrate including a first side and a second side;
a sensing die mounted on the substrate, the sensing die including a diaphragm having a back side and a front side and one or more sensing elements positioned on the front side of the diaphragm; and
an actuator assembly configured to transmit an external force to the diaphragm of the sensing die, the actuator assembly including:
a button member having a force receiving side and a force applying side;
an extender having a first end configured to abut the diaphragm;
wherein one of the force applying side of the button member and the second end of the extender has an indentation defined by an inner surface, and the other one of the force applying side of the button member and the second end of the extender has a tapered portion, where the tapered portion engages the inner surface of the indentation;
wherein the sensing die is configured to output an electrical signal indicative of the external force applied to the force sensor.

13. The force sensor of claim 12, wherein at least part of the second end of the extender is substantially conical in shape.

14. The force sensor of claim 13, wherein the indentation in the button member is substantially round and includes an opening diameter, wherein the opening diameter is smaller than an outer diameter of at least part of the second end of the extender.

15. The force sensor of claim 12, wherein:
the substrate has an opening extending from the first side through to the second side; and the extender extends through the opening in the substrate.

16. The force sensor of claim 12, further comprising:
a cover positioned on the first side of the substrate;
wherein the cover has an opening configured to receive the button member and facilitates the extender engaging the indentation of the button member.

17. The force sensor of claim 16, wherein the button member engages the cover with a connector feature.

18. The force sensor of claim 16, wherein the cover includes one or more protrusions configured to align the cover with respect to the sensing die.

19. A method of manufacturing a force sensor comprising:
mounting a back side of a sensing die to a second side of a substrate, wherein the sensing die includes a diaphragm and one or more sensing elements, wherein the sensing elements are adjacent the front side of the sensing die; and
providing an actuation assembly in contact with a back side of the diaphragm through an opening in the substrate, wherein the actuation assembly is configured to receive an external force and to transmit the received external force to the diaphragm, the actuation assembly including an elongated object extending through the opening in the substrate, where at least part of a first end of the elongated object has a rounded shape in contact with the back side of diaphragm, and a button member having a first side and a second side, where the second side has an indentation configured for receiving a second end of the elongated object.

20. The method of claim 19, further comprising:
positioning a housing member on the first side of the substrate, where the positioned housing member is configured to receive the button member and align the button member with the elongated object.

21. The method of claim 19, further comprising
positioning a protective cover on the second side of the substrate to form a cavity around the sensing die.

22. The method of claim 19, further comprising:
mounting signal conditioning circuitry to the second side of the substrate in electrical communication with the sensing die,
wherein the signal conditioning circuitry is configured to receive an electrical signal from the sensing die and condition the signal to provide a conditioned output signal from the force sensor.

* * * * *